(12) United States Patent
Munakata et al.

(10) Patent No.: US 10,234,830 B2
(45) Date of Patent: Mar. 19, 2019

(54) FEEDBACK CONTROL DEVICE

(71) Applicant: TOYO SYSTEM CO., LTD., Iwaki-shi, Fukushima (JP)

(72) Inventors: Ichirou Munakata, Iwaki (JP); Hideki Shoji, Iwaki (JP)

(73) Assignee: TOYO SYSTEM CO., LTD., Iwaki-shi, Fukushima (JP)

(*) Notice: Subject to any disclaimer, the term of this patent is extended or adjusted under 35 U.S.C. 154(b) by 112 days.

(21) Appl. No.: 15/501,886

(22) PCT Filed: Aug. 8, 2014

(86) PCT No.: PCT/IB2014/001502
§ 371 (c)(1),
(2) Date: Feb. 6, 2017

(87) PCT Pub. No.: WO2016/020717
PCT Pub. Date: Feb. 11, 2016

(65) Prior Publication Data
US 2017/0227936 A1    Aug. 10, 2017

(51) Int. Cl.
*G05B 11/36*    (2006.01)
*G05B 11/42*    (2006.01)
*G05B 7/02*    (2006.01)

(52) U.S. Cl.
CPC ............ *G05B 11/42* (2013.01); *G05B 7/02* (2013.01)

(58) Field of Classification Search
None
See application file for complete search history.

(56) References Cited

U.S. PATENT DOCUMENTS

2014/0225430 A1*  8/2014  Oyobe .................. B60L 7/14
                                                    307/9.1
2015/0263614 A1*  9/2015  Bansal ............... G01R 19/2506
                                                    323/282

FOREIGN PATENT DOCUMENTS

JP        8-168252 A      6/1996
JP     2001-218487 A      8/2001
JP        5122199 B2      1/2013

OTHER PUBLICATIONS

International Search Report for PCT/IB2014/001502 dated Dec. 22, 2014 [PCT/ISA/210].

(Continued)

*Primary Examiner* — Paul B Yanchus, III
(74) *Attorney, Agent, or Firm* — Sughrue Mion, PLLC

(57) ABSTRACT

To provide a feedback control device that achieves smooth continuous control at the time of switching of binary feedback controls. When, as a result of constant current feedback control being performed through a connection between a current control unit 12 and an I control unit 24, a detected measured voltage value of a control object 21 reaches a preset value that is maintained by constant voltage feedback control, a u1/u2 determination unit (switching determination unit) 27 controls changeover switches 22 and 23 to connect a voltage control unit 15 and the I control unit 24 and, in addition, connect the voltage control unit 15 to an adder 25 to which the I control unit 24 is connected, and performs switching to constant voltage feedback control.

6 Claims, 6 Drawing Sheets

(56) References Cited

OTHER PUBLICATIONS

Written Opinion for PCT/IB2014/001502 dated Dec. 22, 2014 [PCT/ISA/210].
Her-Terng Yau et al: "PSO Based PI Controller Design for a Solar Charger System", The Scientific World Journal; vol. 2013, Dec. 31, 2013 (Dec. 31, 2013), pp. 1-13.
Communication dated Jun. 29, 2018, from the European Patent Office in counterpart application No. 14899488.2.

* cited by examiner

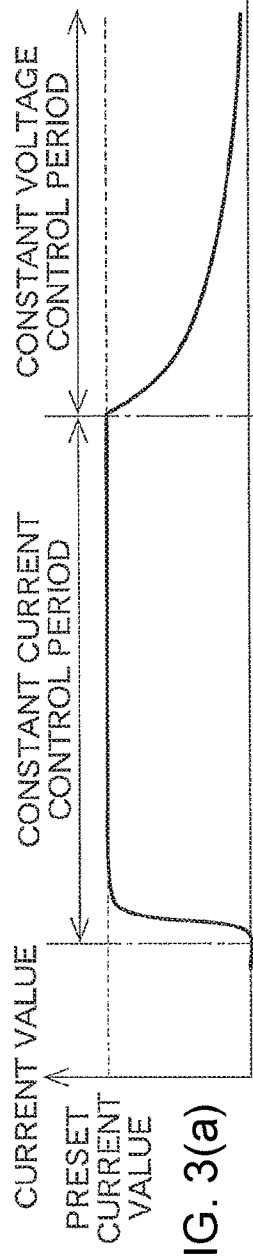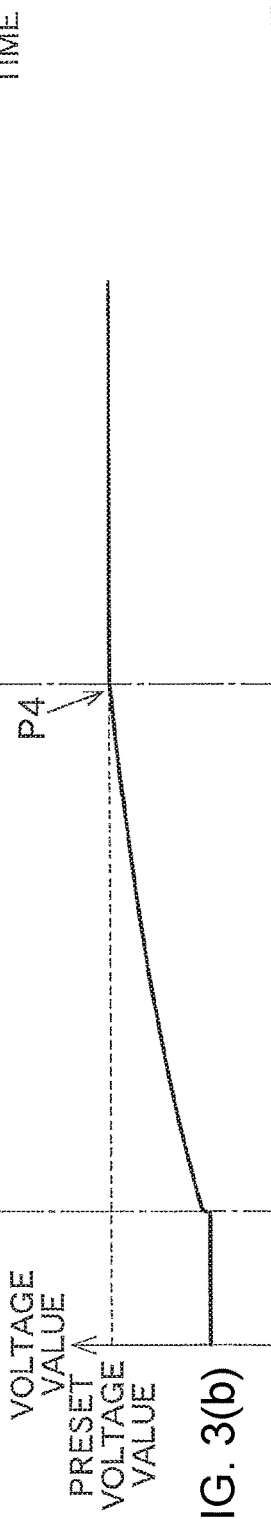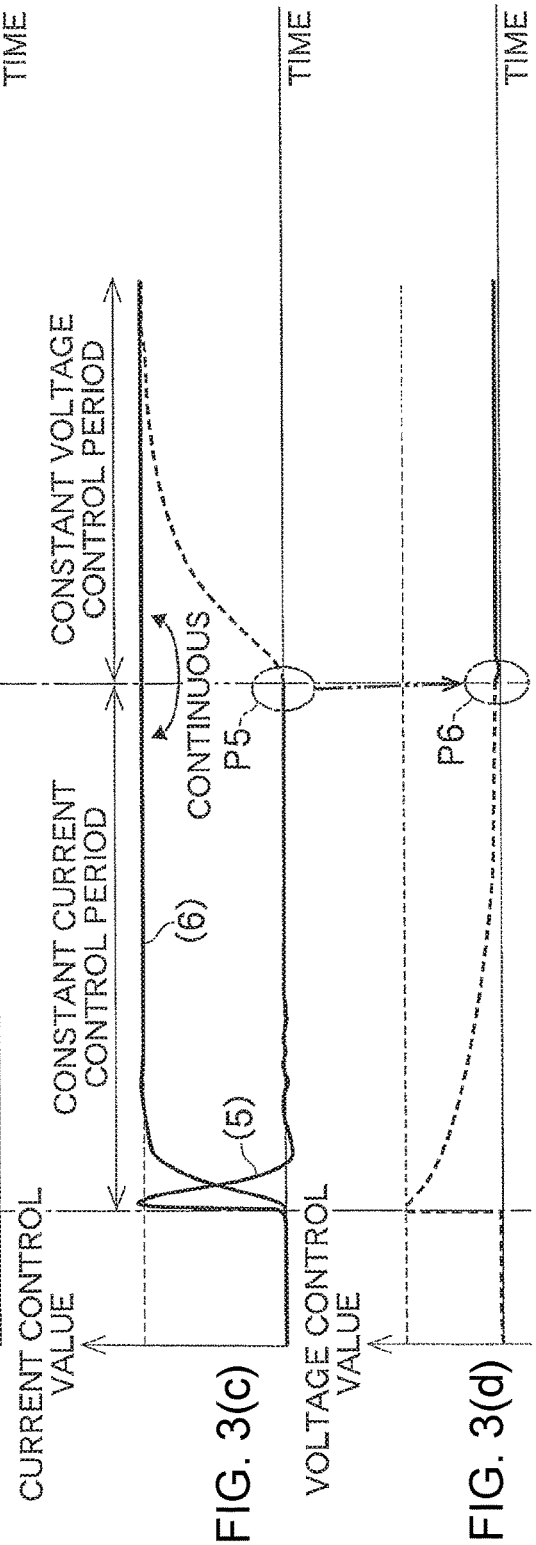

FEEDBACK CONTROL DEVICE

CROSS REFERENCE TO RELATED APPLICATIONS

This application is a National Stage of International Application No. PCT/IB2014/001502, filed on Aug. 8, 2014, the contents of which are incorporated herein by reference in their entirety.

TECHNICAL FIELD

The present invention relates to a feedback control device that controls a control object by switching feedback control of binary parameters.

BACKGROUND ART

For example, a step-up/step-down converter or the like that steps up and down an input voltage includes two-channel control means, and performs the respective feedback controls in a switching manner (see, for example, Patent reference 1). This device is configured to step up or down a power supply voltage to be supplied to a capacitor, a secondary cell or battery and then to perform a power running operation or a regeneration operation. Specifically, it includes a PI control system used to perform a step-up operation and a PI control system used to perform a step-down operation, and these control systems are connected to a power output means or the like in a switching manner to perform the respective device operations described above. In addition, some of the devices that perform two-channel feedback control perform continuous control while switching between, for example, constant current control and constant voltage control.

FIG. 4 is an explanatory diagram illustrating a configuration of a conventional PI control device. This figure illustrates an example configuration of a PI control device 101 that performs feedback control (PI control) on a control object 111 such as, for example, a capacitor.

The PI control device 101 includes the following elements as a current control system: a reference input unit (A) 102 that receives an input of a set current value from outside, a current control unit 103 that performs PI control using this set current value, and a current measurement unit (A') 104 that measures the current flowing through the control object 111.

The PI control device 101 further includes the following elements as a voltage control system: a reference input unit (B) 105 that receives an input of a set voltage value from outside, a voltage control unit 106 that performs PI control using this set voltage value, and a voltage measurement unit (B') 107 that measures the voltage generated in or being applied to the control object 111.

An output point of the current control unit 103 and an output point of the voltage control unit 106 are connected to an output control unit 108 via a changeover switch 109. The changeover switch 109 is connected to a switching determination unit 110 that determines switching between the aforementioned current control and voltage control in accordance with, for example, the voltage output of the control object 111 or the like.

The output control unit 108 includes, for example, a power semiconductor element, and is configured to output a voltage or current having a magnitude corresponding to a control signal (output voltage) or the like output from the current control unit 103 or the voltage control unit 106 to the control object 111.

The current control unit 103 includes a subtractor 201 that determines a difference between the respective output values of the reference input unit (A) 102 and the current measurement unit (A') 104, a P control unit 202 that determines a P control value using the output value of the subtractor 201, an I control unit 203 that determines an I control value using the output value of the subtractor 201, and an adder 204 that adds together the respective output values of the P control unit 202 and the I control unit 203 to determine a PI control value.

The voltage control unit 106 includes a subtractor 205 that determines a difference between the respective output values of the reference input unit (B) 106 and the voltage measurement unit (B') 107, a P control unit 206 that determines a P control value using the output value of the subtractor 205, an I control unit 207 that determines an I control value using the output value of the subtractor 205, and an adder 208 that adds together the respective output values of the P control unit 206 and the I control unit 207 to determine a PI control value.

FIG. 5 is an explanatory diagram illustrating a configuration of a conventional PID control device. An illustrated PID control device 120 has a similar configuration to the PI control device 101 in FIG. 4, except for a current control unit 121 and a voltage control unit 122.

The current control unit 121 includes a subtractor 201, a P control unit 202, an I control unit 203, and an adder 204, and further includes a D control unit 210 that determines a D control value using the output value of the subtractor 201. The adder 204 of the current control unit 121 is configured to add together the respective output values of the P control unit 202, the I control unit 203, and the D control unit 210 and to output a PID control value.

The voltage control unit 122 includes a subtractor 205, a P control unit 206, an I control unit 207, and an adder 208, and further includes a D control unit 211 that determines a D control value using the output value of the subtractor 205. The adder 208 of the voltage control unit 122 is configured to add together the respective output values of the P control unit 206, the I control unit 207, and the D control unit 211 and to determine a PID control value.

Next, the operation will be described.

The PID control device 120 in FIG. 5 operates in a manner similar to the PI control device 101, except that it controls the control object 111 using values including the respective output values of the D control units 210 and 211, and the operation of the PI control device 101 will thus be representatively described here. In addition, the charging operation on the control object 111 will be exemplarily described. In the following, control switching is performed in a similar manner even if charging is substituted with discharging.

When a set current value is input to the current control unit 103 from outside through the reference input unit (A) 102 in the manner described previously, the current control unit 103 determines, using the subtractor 201 included therein, the deviation of the measured value of the current flowing through the control object 111, which current is output from the current measurement unit (A') 104, from the aforementioned set current value, and the resulting value is input to the P control unit 202 and the I control unit 203. The respective values determined by the P control unit 202 and the I control unit 203 are added together using the adder 204 to determine a PI control value (current control value).

Further, when a set voltage value is input to the voltage control unit 106 from outside through the reference input unit (B) 105, the voltage control unit 106 determines, using the subtractor 205 included therein, the deviation of the measured value of the voltage across, for example, electrodes of the control object 111, which is output from the voltage measurement unit (B') 107, from the aforementioned set voltage value, and the resulting value is input to the P control unit 206 and the I control unit 207. The respective values determined by the P control unit 206 and the I control unit 207 are added together using the adder 208 to determine a PI (Integral) control value (voltage control value).

FIG. 6 includes explanatory diagrams illustrating the operation of the PI control device in FIG. 4. These figures illustrate a control operation when the switching determination unit 110 controls the changeover switch 109.

FIG. 6(*a*) illustrates the change in charging current supplied from the PI control device 101 to the control object 111 over time, with the vertical axis representing current values and the horizontal axis representing elapsed time.

FIG. 6(*b*) illustrates the change in, for example, the inter-electrode voltage of the control object 111 connected to the PI control device 101 over time, with the vertical axis representing voltage values and the horizontal axis representing elapsed time.

FIG. 6(*c*) illustrates the change in current control over time when a charging current is supplied to the control object 111 as described above, with the vertical axis representing current control values and the horizontal axis representing elapsed time. Note that, in FIG. 6(*c*), the P control value (graph (1)) output from the P control unit 202 and the I control value (graph (2)) output from the I control unit 203 are illustrated in terms of current control values.

FIG. 6(*d*) illustrates the change in voltage control over time when the charging current described above is supplied (a charging voltage is applied), with the vertical axis representing voltage control values and the horizontal axis representing elapsed time. Note that, in FIG. 6(*d*), the P control value (graph (3)) output from the P control unit 206 and the I control value (graph (4)) output from the I control unit 207 are illustrated in terms of voltage control value.

In a case where the control object 111 is, for example, a lithium-ion secondary cell or battery and a charging current is to be supplied to the control object 111, the switching determination unit 110 controls the changeover switch 109 to connect the current control unit 103 and the output control unit 108 when charging begins. The current control unit 103 connected to the output control unit 108 performs PI control so that a charging current to be supplied to the control object 111 becomes equal to the set current value input from the reference input unit (A) 102.

In this case, the current control unit 103 determines the deviation of the measured current value measured by the current measurement unit (A') 104 from the set current value described above, and adjusts the current control value, which is determined by P control and I control as illustrated in FIG. 6(*c*), to perform constant current control (PI control) so that the subsequent measured current values are set equal to the set current value and maintained constant.

As described previously, when, with the progress of charging by constant current control, as illustrated in FIG. 6(*b*), the voltage value of the control object 111 increases and reaches the set voltage value input by the reference input unit (B) 105, the switching determination unit 110 determines that a switching condition occurs at an illustrated point P1, and switches the connection of the changeover switch 109 to connect the voltage control unit 106 and the output control unit 108.

In other words, for example, when the measured voltage value of the voltage measurement unit (B') 107 reaches the set voltage value, the switching determination unit 110 switches from constant current control, which has just been performed, to constant voltage control at a point P2 in FIG. 6(*c*).

When the voltage control unit 106 is connected to the output control unit 108 by the control switching described above, it determines a voltage control value for keeping the inter-electrode voltage of the control object 111 constant in a manner as depicted in a constant voltage control period illustrated in FIG. 6(*b*).

Immediately after the switching determination unit 110 has performed switching from constant current control to constant voltage control, the voltage control value output from the voltage control unit 106 is unstable in a manner depicted at a point P3 (varying period) illustrated in FIG. 6(*d*) and particularly the voltage control value determined by I control markedly varies, making the voltage or the like being supplied to the control object 111 unstable.

PRIOR ART REFERENCE

Patent Reference

Patent reference 1: Japanese Patent No. 5122199

SUMMARY OF INVENTION

Problem to be Solved by the Invention

A conventional feedback control device is configured in the manner described above, and thus has a problem in that when control switching is performed on binary parameters, a feedback control value varies, causing unstable control for a control object.

The present invention has been made in order to overcome the problem described above, and an object thereof is to provide a feedback control device that achieves smooth continuous control at the time of switching of binary feedback controls.

Means for Solving the Problems

A feedback control device according to the present invention includes a first control unit that includes a first proportional control unit and that performs first feedback control on a control object; a second control unit that includes a second proportional control unit and that performs second feedback control on the control object; an integral control unit used for the first feedback control and the second feedback control; an output control unit that controls a control object using a control value generated by the first control unit and the integral control unit or by the second control unit and the integral control unit; a changeover switch that switches between a connection between the first control unit and the integral control unit, and a connection between the second control unit and the integral control unit; and a switching determination unit that detects a state of the control object to control a switching operation of the changeover switch, wherein when, as a result of the first feedback control being performed through the connection between the first control unit and the integral control unit, a value indicating a detected state of the control object reaches a preset value that is maintained by the second feedback control, the switching determination unit controls the changeover switch to connect the second control unit and the integral control unit, and performs switching to the second feedback control.

Furthermore, the first control unit further includes a first differential control unit, the second control unit further includes a second differential control unit, first PID control as the first feedback control is performed on the control object, and second PID control as the second feedback control is performed on the control object)

Furthermore, when a charging power is to be supplied to or discharged from the control object, the first feedback control is constant current control and the second feedback control is constant voltage control; and upon detecting a voltage across terminals of the control object having reached a preset voltage while the output control unit performs a charging or discharging operation under the constant current control, the switching determination unit performs switching to the constant voltage control, under which a charging operation is performed.

Effect of the Invention

According to the present invention, it is possible to reduce variations in control value when switching is performed from first feedback control to second feedback control, and it is possible to achieve smooth continuous feedback control.

BRIEF DESCRIPTION OF THE DRAWINGS

FIGS. 3(a) to 3(d) include explanatory diagrams illustrating the operation of the feedback control device according to the embodiment of the present invention.

MODES FOR CARRYING OUT THE INVENTION

An embodiment of the present invention will be described hereinafter.

Embodiment

Figure 1:
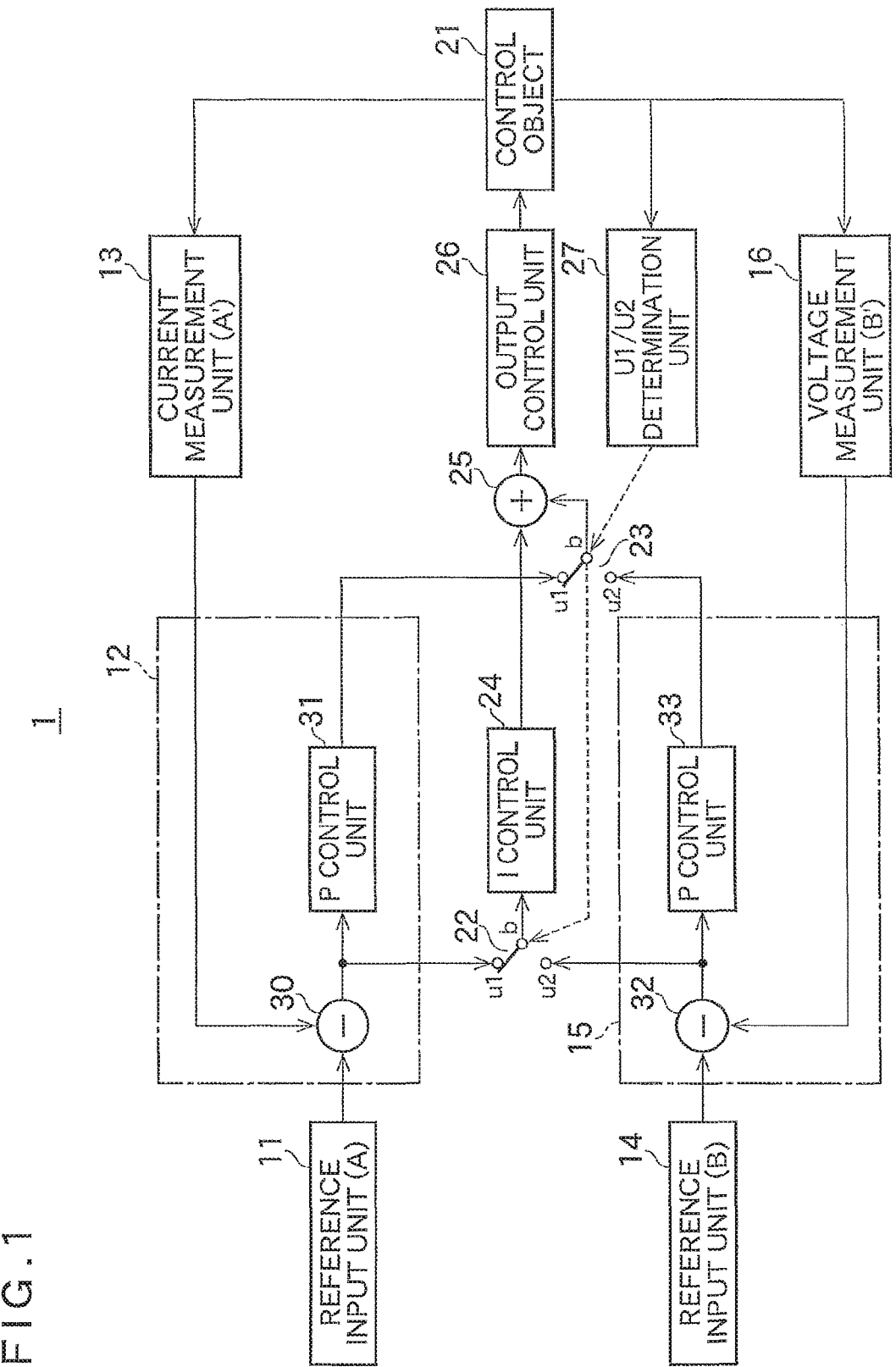
FIG. 1 is an explanatory diagram illustrating a configuration of a feedback control device according to an embodiment of the present invention.

FIG. 1 is an explanatory diagram illustrating a configuration of a feedback control device according to an embodiment of the present invention. This figure illustrates a PI control device 1, which is an example configuration of the feedback control device.

The PI control device 1 includes a reference input unit (A) 11 that receives an input of a sot current value from outside, a current control unit 12 that receives an input of the set current value through the reference input unit (A) 11 and that determines a control value for maintaining, for example, a charging current to be supplied to a control object 21 constant, and a current measurement unit (A') 13 that measures the current flowing through the control object 21 and that converts, for example, the measured current value into a signal in a predetermined form processable by a subtractor 30 or generates this signal.

The PI control device 1 further includes a reference input unit (B) 14 that receives an input of a set voltage value from outside, a voltage control unit 15 that receives an input of the set voltage value through the reference input unit (B) 14 and that determines a control value for maintaining, for example, a charging voltage to be applied to the control object 21 constant, and a voltage measurement unit (B') 16 that measures, for example, the inter-electrode voltage of the control object 21 and that converts, for example, this measured voltage value into a signal in a prescribed form processable by a subtractor 32 or generates this signal.

Furthermore, the PI control device 1 includes an input changeover switch 22, an output changeover switch 23, an I control unit 24, an adder 25, an output control unit 26, and a u1/u2 determination unit 27.

The control object 21 is an object on which prescribed control is to be performed by the output control unit 26 of the PI control device 1, and is, for example, a capacitor, a secondary cell or battery, or the like.

Here, supply of charging power to the control object 21 will be exemplarily described.

The current control unit 12 includes the subtractor 30, which determines the deviation of the measured current value input from the current measurement unit (A') 13 from the set current value input from the reference input unit (A) 11, and a P control unit 31 that determines a P control value using the output value of the subtractor 30.

The voltage control unit 15 includes the subtractor 32, which determines the deviation of the measured voltage value input from the voltage measurement unit (B') 16 from the set voltage value input from the reference input unit (B) 14, and a P control unit 33 that determines a P control value using the output value of the subtractor 32.

An output point of the subtractor 30 is connected to an input point of the P control unit 31 and a contact u1 of the input changeover switch 22.

An output point of the subtractor 32 is connected to an input point of the P control unit 33 and a contact u2 of the input changeover switch 22.

A base b of the input changeover switch 22 is connected to an input point of the I control unit 24 that determines an I control value, and is configured to connect the output point of any one of the subtractor 30 and the subtractor 32 to the input point of the I control unit 24.

An output point of the I control unit 24 is connected to a first input point of the adder 25. Further, a second input point of the adder 26 is connected to a base b of the output changeover switch 23.

An output point of the P control unit 31 is connected to a contact u1 of the output changeover switch 23, and an output point of the P control unit 33 is connected to a contact u2 of the output changeover switch 23. A configuration is made such that the output point of any one of the P control unit 31 and the P control unit 33 is connected to the second input point of the adder 25.

An output point of the adder 25 is connected to an input point of the output control unit 26, and is configured such that any one of a current control value generated by the current control unit 12 and the I control unit 24 (more specifically, a PI control value obtained by adding together the P control value output from the P control unit 31 and the I control value output from the I control unit 24) or a voltage control value generated by the voltage control unit 15 and the I control unit 24 (more specifically, a PI control value obtained by adding together the P control value output from the P control unit 33 and the I control value output from the I control unit 24) is input to the output control unit 26.

The output control unit 26 is configured to control the control object 21 in accordance with a PI control value generated by the addition processing of the adder 25. Specifically, it is configured to supply, for example, a charging current corresponding to the aforementioned current control value to the control object 21, and is also configured to apply a charging voltage corresponding to the aforementioned voltage control value to the control object 21.

The u1/u2 determination unit 27 is configured to monitor the state of the control object 21, and, more specifically, it includes a voltage detecting means for detecting, for example, the inter-electrode voltage of the control object 21, a current detecting means for detecting the value of the current flowing through the control object 21 (for example, the charging current being supplied to the control object 21, etc.), and so forth, and is configured to control the respective switching operations of the input changeover switch 22 and the output changeover switch 23 in accordance with the values detected by these detecting means.

Figure 2:
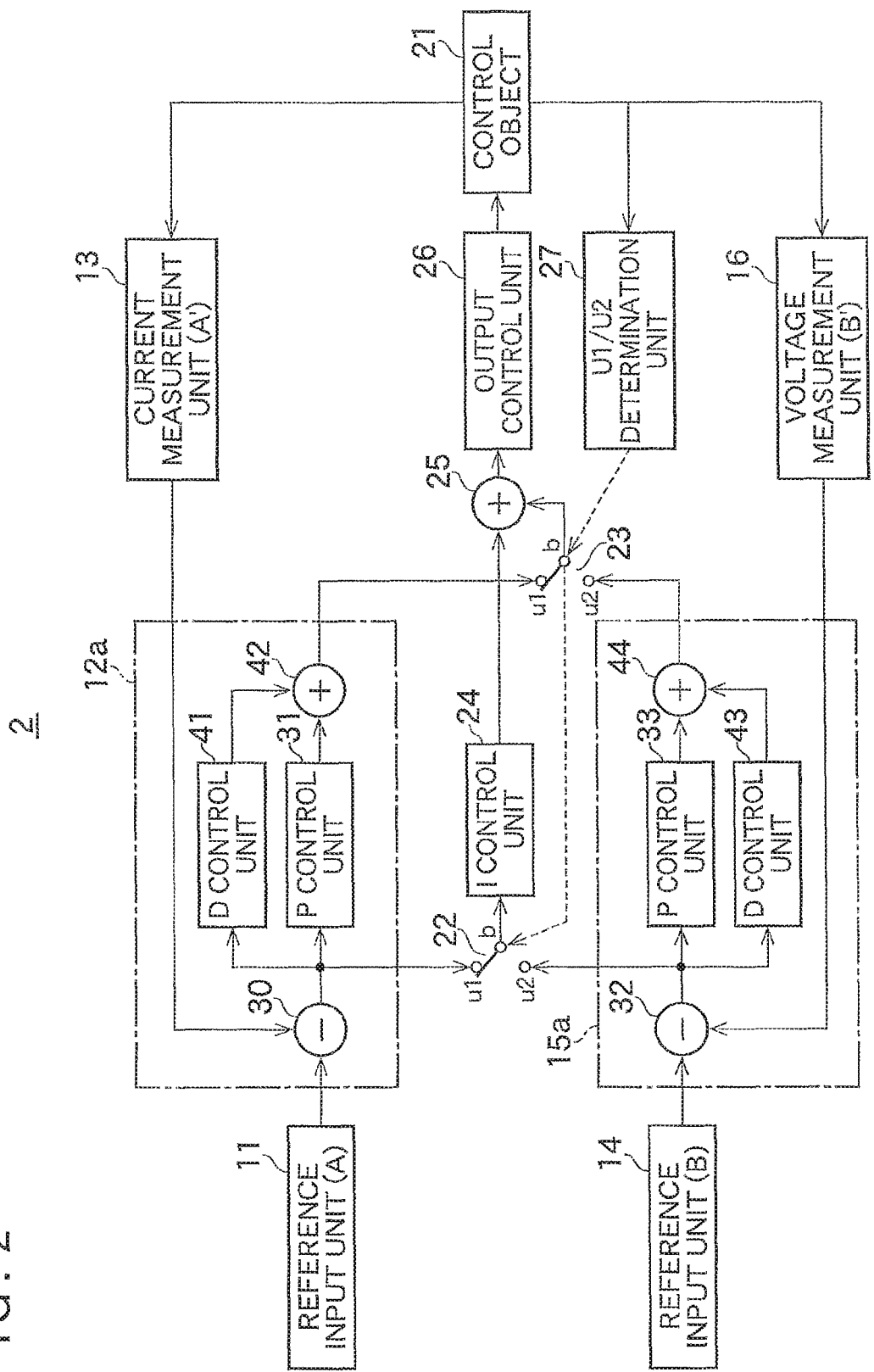
FIG. 2 is an explanatory diagram illustrating another configuration of the feedback control device according to the embodiment of the present invention.
Figure 4:
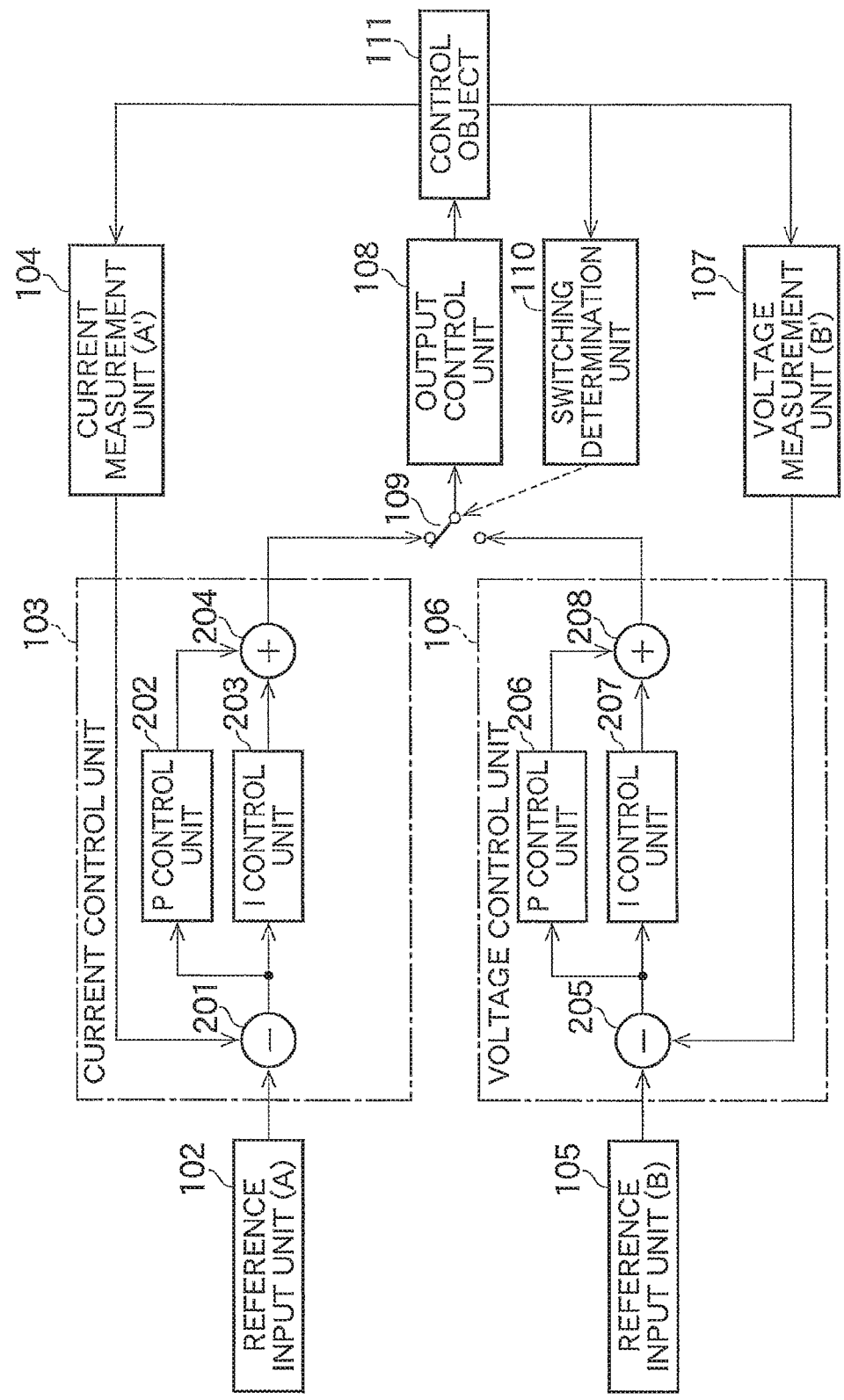
FIG. 4 is an explanatory diagram illustrating a configuration of a conventional PI control device.
Figure 5:
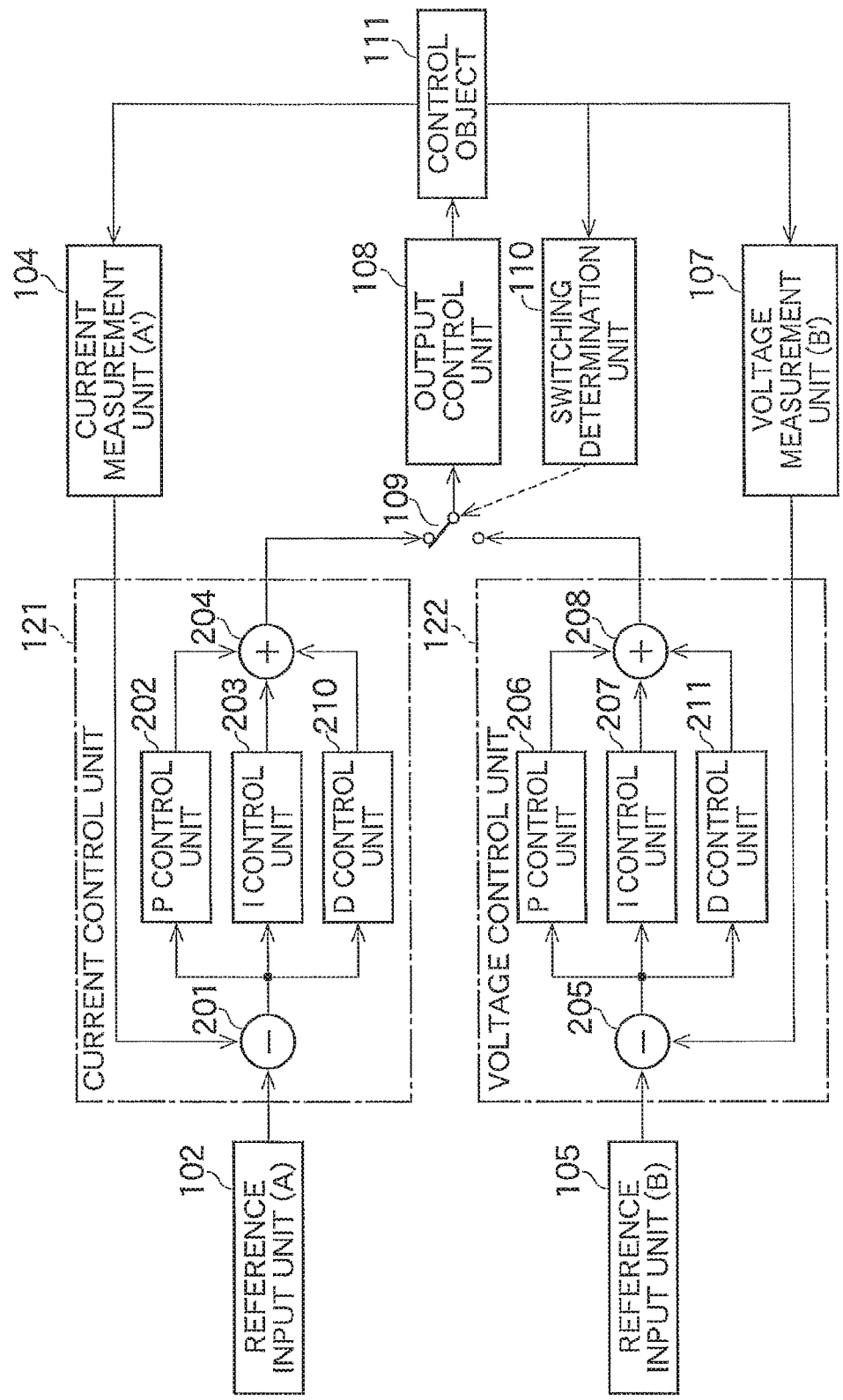
FIG. 5 is an explanatory diagram illustrating a configuration of a conventional PID control device.
Figure 6A:
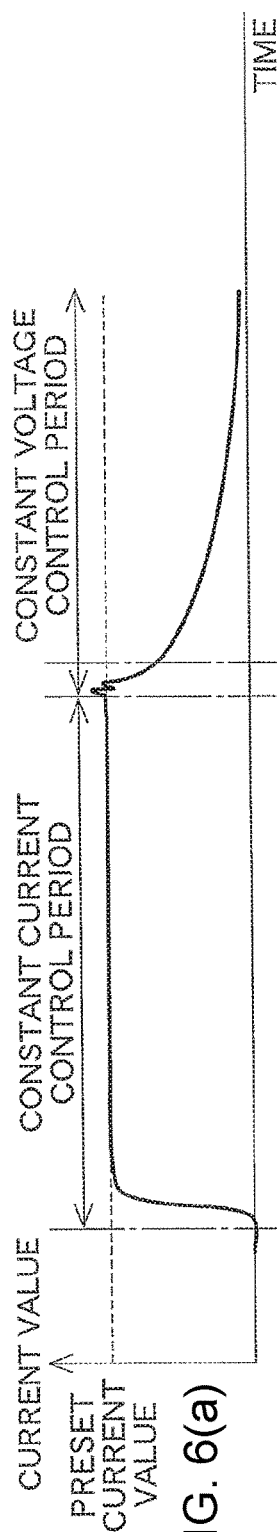
FIGS. 6(a) to 6(d) is an are explanatory diagrams illustrating the operation of the PI control device in FIG. 4.
Figure 6B:
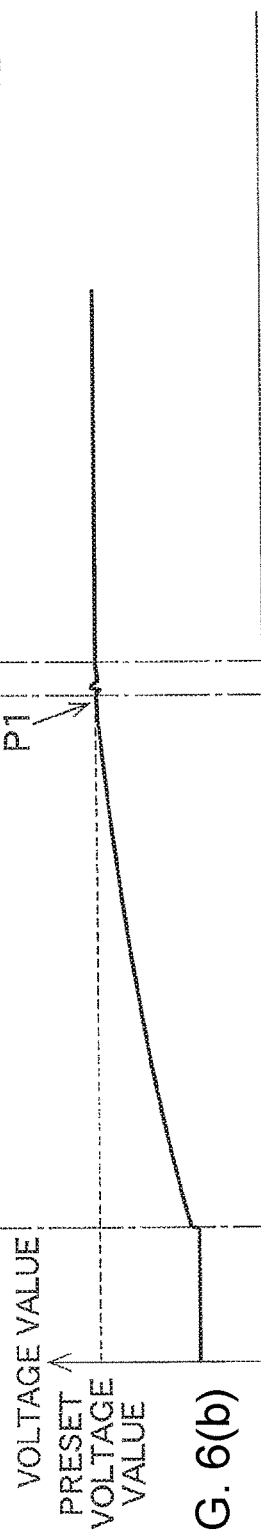
Figure 6C:
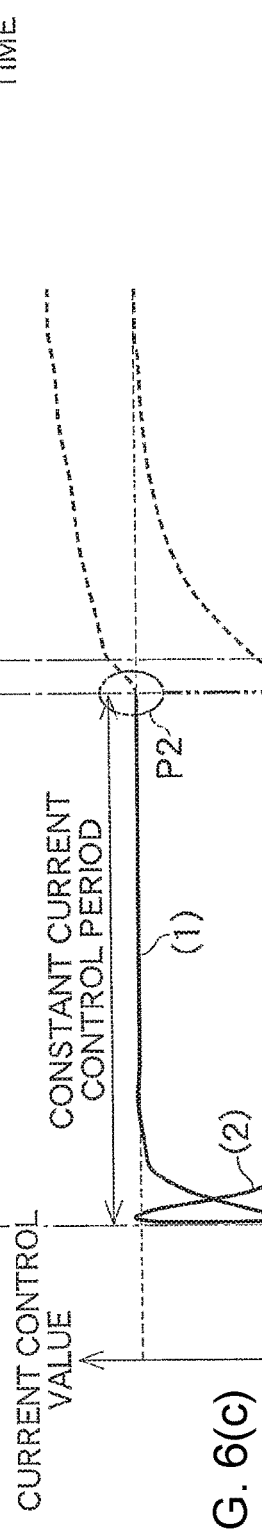
Figure 6D:
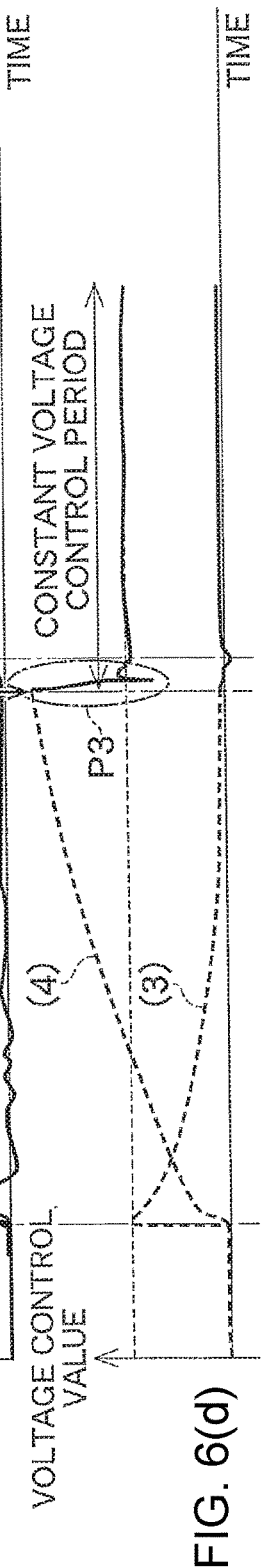

FIG. 2 is an explanatory diagram illustrating another configuration of the feedback control device according to the embodiment of the present invention. This figure illustrates a PID control device 2, which is another example configuration of the feedback control device. The same numerals are used for portions identical to or corresponding to those illustrated in FIG. 1, and a description thereof is omitted.

A current control unit 12a included in the PID control device 2 includes a subtractor 30 and a P control unit 31, and further includes a D control unit 41 that determines a D (Differential) control value, and an adder 42. Further, a voltage control unit 15a includes a subtractor 32 and a P control unit 33, and further includes a D control unit 43 and an adder 44.

The D control unit 41 of the current control unit 12a has an input point connected, together with an input point of the P control unit 31, to an output point of the subtractor 30 and a contact u1 of the input changeover switch 22.

An output point of the D control unit 41 is connected to a first input point of the adder 42, and an output point of the P control unit 31 is connected to a second input point of the adder 42. That is, the D control unit 41 is connected in parallel with the P control unit 31, and is connected so as to receive an input of the same input value as that of the P control unit 31, that is, the output value of the subtractor 30. Furthermore, a connection is made such that the D control value determined by the D control unit 41 is input to the adder 42 and is added to the P control value determined by the P control unit 31.

An output point of the adder 42 is connected to a contact u1 of the output changeover switch 23.

The D control unit 43 of the voltage control unit 16a has an input point connected, together with an input point of the P control unit 33, to an output point of the subtractor 32 and a contact u2 of the input changeover switch 22.

An output point of the D control unit 43 is connected to a first input point of the adder 44, and an output point of the P control unit 33 is connected to a second input point of the adder 44. That is, the D control unit 43 is connected in parallel with the P control unit 33, and is connected so as to receive an input of the same input value as that of the P control unit 33, that is, the output value of the subtractor 32. Furthermore, a connection is made such that the D control value determined by the D control unit 43 is input to the adder 44 and is added to the P control value determined by the P control unit 33.

An output point of the adder 44 is connected to a contact u2 of the output changeover switch 23.

Next, the operation will be described.

The PID control device 2 illustrated in FIG. 2 is configured in a manner similar to the PI control device 1 in FIG. 1, except that it includes the D control units 41 and 43 and the adders 42 and 44, and also operates in a similar manner in terms of the switching operation between constant current control and constant voltage control. The charging operation of the PI control device 1 illustrated in FIG. 1 will be representatively described here. Note that the discharging operation in which two control loops are switched can also be performed in a similar way, in which case "charging" will be substituted with "discharging," "increase" will be substituted with "decrease," and so forth in the following description.

FIG. 3 includes explanatory diagrams illustrating the operation of the feedback control device according to the embodiment of the present invention. These figures illustrate a control operation when the u1/u2 determination unit 27 controls the changeover switches 22 and 23.

In a case where the control object 21 is, for example, a lithium-ion secondary cell or battery, charging is performed while a current value (a set current value set by the reference input unit (A) 11) specified in the specifications or the like of this lithium-ion secondary cell or battery is maintained when charging begins. In addition, when the inter-electrode voltage of the lithium-ion secondary cell or battery increases due to this constant-current charging and this voltage value reaches a specified voltage (a set voltage value set by the reference input unit (B) 14) determined based on the specifications or the like of the lithium-ion secondary cell or battery, constant-voltage charging is continuously performed with this specified voltage maintained.

PI control in the charging operation of a lithium-ion secondary cell or battery will be exemplarily described here.

In FIG. 3, a period during which the constant-current charging described above is performed is represented as a "constant current control period," and a period during which constant-voltage charging is performed with a set voltage value (the specified voltage described above) maintained is represented as a "constant voltage control period."

Note that the set current value input from the reference input unit (A) 11 and the set voltage value input from the reference input unit (B) 14 are input from outside, as necessary, and are input to and set in the PI control device 1, for example, before the charging operation begins.

FIG. 3(a) illustrates the change in current supplied from the PI control device 1 to the control object 21 over time, with the vertical axis representing current values and the horizontal axis representing elapsed time.

FIG. 3(b) illustrates the change in, for example, the inter-electrode voltage of the control object 21 connected to the PI control device 1 over time, with the vertical axis representing voltage values and the horizontal axis representing elapsed time.

FIG. 3(c) illustrates the change in current control over time when a charging current is supplied to the control object 21 as described above, with the vertical axis representing current control values and the horizontal axis representing elapsed time. Note that, in FIG. 3(c), the P control value (graph (5)) output from the P control unit 31 and the I control value (graph (6)) output from the I control unit 24 are illustrated in terms of current control values.

FIG. 3(d) illustrates the transition in voltage control when the charging current described above is supplied (a charging voltage is applied), with the vertical axis representing voltage control values and the horizontal axis representing elapsed time. Note that, in FIG. 3(d), the P control value output from the P control unit 33 is illustrated in terms of voltage control. The I control value output from the I control unit 24 in this voltage control is as indicated by the graph (6) illustrated in the constant voltage control period in FIG. 3(c).

In a case where the control object 21 is a lithium-ion secondary cell or battery or the like, when a charging current is to be supplied to the control object 21, the u1/u2 determination unit 27 connects the respective bases b of the input changeover switch 22 and the output changeover switch 23 to the contacts u1 in order to first perform charging by constant current control. That is, the output point of the subtractor 30 of the current control unit 12 and the input point of the I control unit 24 are connected to each other, and, in addition, the output point of the current control unit 12 (the P control unit 31) and the output point of the I control unit 24 are connected to the output control unit 26 through the adder 25.

In the switch connection state described above, the set current value input from the reference input unit (A) 11 is input to the subtractor 30 together with the measured current value output from the current measurement unit (A') 13.

The value (deviation) determined by the subtractor 30 is input to the P control unit 31 and is also input to the I control unit 24 via the input changeover switch 22 to determine a P control value and an I control value at this point in time.

The I control value from the I control unit 24 is input to the adder 25, and the P control value from the P control unit 31 is input to the adder 25 via the output changeover switch 23. The adder 25 determines a PI control value from these control values, and outputs it to the output control unit 26.

The output control unit 26 supplies a charging current corresponding to the input PI control value to the control object 21. This charging current, the magnitude of which is measured by the current measurement unit (A') 13, is output as a measured current value at the next point in time to the subtractor 30.

The subtractor 30 determines the deviation of the measured current value at the point in time described above from the aforementioned set current value (an input reference value), and outputs the resulting value to the P control unit 31 and also to the I control unit 24 via the input changeover switch 22.

Thereafter, the P control unit 31 and the I control unit 24 determine a P control value and an I control value with respect to the new input value, and the adder 25 generates a new PI control value. This PI control value is input to the output control unit 26, and feedback control is performed to apply compensation so that, as illustrated in FIG. 3(a), a charging current to be supplied from the output control unit 26 to the control object 21 becomes equal to the set current value (in the illustrated constant current control period).

In the constant current control, as described above, a constant current control loop is formed by the P control unit 31, the I control unit 24, the adder 25, the output control unit 26, (the control object 21), the current measurement unit (A') 13, the subtractor 30, and so forth.

As described previously, supplying a charging current that is maintained constant to the control object 21 increases the voltage value across the electrodes or across a charging terminal of the control object 21 in the manner illustrated in FIG. 3(b).

When the u1/u2 determination unit 27 recognizes that the inter-electrode voltage of the control object 21 reaches the set voltage value at the time of a point P4 illustrated in FIG. 3(b), it switches the control of the charging operation from the constant current control to the constant voltage control. Specifically, the input changeover switch 22 and the output changeover switch 23 are controlled to connect the respective bases b of the switches from the contacts u1 to the contacts u2 in a switching manner.

The I control unit 24 has received an input of the latest deviation for constant current control at the time of the point P4 at which the constant voltage control is started. That is, since the switching from the constant current control to the constant voltage control is performed in the state described above, the I control unit 24 always operates in a constant current control loop or a constant voltage control loop, and, as illustrated in graph (6) in FIG. 3(c), continues the output of I control values without greatly varying the I control value at the time of control switching.

In the control switching at the time of the point P4, furthermore, as described previously, the contact connection of the output changeover switch 23 is switched so that the connection between the adder 25 and the P control unit 31 is disconnected and the P control unit 33 is connected to the input point of the adder 25. That is, the input of the P control value for constant current control from the P control unit 31 to the adder 25 is interrupted at a point P5 illustrated in FIG. 3(c), and the input of the P control value for constant voltage control from the P control unit 33 to the adder 25 is started at a point P6 illustrated in FIG. 3(d). Note that the points P4 to PG described above have time lengths that can be regarded as the same point in time within a charging period.

The feedback control system used for constant voltage control, that is, the voltage control unit 15 and so forth, is not included in a control loop that operates in the constant current control period in FIG. 3. In the constant current control period, as the charging operation progresses, the inter-electrode voltage of the control object 21 approaches the set voltage value. Accordingly, feedback control does not work in the constant current control period; however, the deviation determined by the subtractor 32 of the voltage control unit 15 decreases in this constant current control period as charging progresses, and the P control value determined by the P control unit 33 also transitions to a value in accordance with which a small amount of compensation is required.

From the foregoing, the P control unit 33 can generate a P control value for compensating for the charging voltage to be output from the output control unit 26 so that the charging voltage is equal to the set voltage value when the constant voltage control begins at the time of the point P6.

In this manner, an appropriate P control value is output from the P control unit 33 of the voltage control unit 15, and, in addition, as described previously, a substantially reasonable value is also output as a constant voltage control value from the I control unit 24. Accordingly, the PI control value to be input to the output control unit 26 does not greatly shift from an appropriate value at the time of switching from the constant current control to the constant voltage control. Thus, stable PI control can be continuously performed.

In order to maintain the set voltage value input from the reference input unit (B) 14 in advance constant as a charging voltage in the "constant voltage control period" illustrated in FIG. 3, as described previously, the connections of the respective bases b of the input changeover switch 22 and the output changeover switch 23 are switched from the contacts u1 to the contacts u2 by control of the u1/u2 determination unit 27, allowing the voltage control unit 15 and so forth to operate to perform feedback control using a constant voltage control loop.

The constant voltage control loop described above is formed by the P control unit 33, the I control unit 24, the adder 25, the output control unit 26, (the control object 21), the voltage measurement unit (B') 16, the subtractor 32, and so forth.

Specifically, the voltage measurement unit (B') 16 measures, for example, the inter-electrode voltage of the control object 21, and the subtractor 32 determines the deviation of the measured voltage value described above from the set voltage value. This deviation is input to the P control unit 33 and the I control unit 24 to determine a P control value and an I control value corresponding to this deviation.

The adder 25 receives an input of the P control value and I control value described above, and determines a PI control value for constant voltage control. The output control unit 26 performs a control operation to apply compensation so that the voltage across the electrodes or the charging terminal of the control object 21 becomes equal to the set voltage value in accordance with the input PI control value for constant voltage control, and supplies a charging voltage to the control object 21. The charging operation under the constant voltage control described above is continuously performed until, for example, the charging current value measured by the current measurement unit (A') 13 is smaller than a preset value.

In this way, control for the control object 21 is smoothly switched, and, as appropriate, a series of control operations is terminated.

As described above, according to this embodiment, the current control unit 12 and the I control unit 24 are connected for constant current control, and the voltage control unit 15 and the I control unit 24 are connected for constant voltage control to generate a PI control value, and a charging current is supplied from the output control unit 26 to the control object 21. Accordingly, it is possible to prevent large variations in PI control value at the time of switching from the constant current control to the constant voltage control, and it is possible to perform stable control on the control object 21.

REFERENCE SIGNS LIST

1 PI control device
2 PID control device
11 reference input unit (A)
12, 12a current control unit
13 current measurement unit (A')
14 reference input unit (B)
15, 15a voltage control unit
16 voltage measurement unit (B')
21 control object
22 input changeover switch
23 output changeover switch
24 I (Integral) control unit
25, 42, 44 adder
26 output control unit
27 u1/u2 determination unit (switching determination unit)
30, 32 subtractor
31, 33 P (Proportional) control unit
41, 43 D (Differential) control unit
101 PI control device
102 reference input unit (A)
103 current control unit
104 current measurement unit (A')
105 reference input unit (B)
106 voltage control unit
107 voltage measurement unit (B')
108 output control unit
109 changeover switch
110 u1/u2 determination unit (switching determination unit)
120 PID control device
111 control object
121 current control unit
122 voltage control unit
201, 205 subtractor
202, 206 P (Proportional) control unit
203, 207 I (Integral) control unit
204, 208 adder
210, 211 D (Differential) control unit

The invention claimed is:

1. A feedback control device comprising:
a first control unit that includes a first proportional control unit and that performs current feedback control on a control object;
a second control unit that includes a second proportional control unit and that performs voltage feedback control on the control object;
an integral control unit configured to be switched between the current feedback control and the voltage feedback control;
an output control unit that controls a control object using a control value generated by the first control unit and the integral control unit or by the second control unit and the integral control unit;
a changeover switch that switches between a connection between:
(i) the first control unit and the integral control unit, and
(ii) a connection between the second control unit and the integral control unit; and
a switching determination unit that detects a state of the control object to control a switching operation of the changeover switch, wherein
when, as a result of the current feedback control being performed through the connection between the first control unit and the integral control unit, a value indicating a detected state of the control object reaches a preset value that is maintained by the voltage feedback control,
the switching determination unit controls the changeover switch to connect the second control unit and the integral control unit, and performs switching to the voltage feedback control, wherein the control of the changeover switch is configured to prevent large variations in an output of the integral control unit at a time of switching from the current feedback control to the voltage feedback control, and wherein the prevention of the large variations enables stable control of the control object.

2. The feedback control device according to claim 1, wherein
the first control unit further includes a first differential control unit,
the second control unit further includes a second differential control unit, and
the first control unit is configured to perform first PID control as the current feedback control is performed on the control object, and
the second control unit is configured to perform second PID control as the voltage feedback control is performed on the control object.

3. The feedback control device according to claim 1, wherein when a charging power is to be supplied to or discharged from the control object, the current feedback control is constant current control and the voltage feedback control is constant voltage control, and upon detecting a voltage across terminals of the control object having reached a preset voltage while the output control unit performs a charging or discharging operation under the constant current control, the switching determination unit performs switching to the constant voltage control, under which a charging operation is performed.

4. The feedback control device according to claim 2, wherein when a charging power is to be supplied to or discharged from the control object, the current feedback control is constant current control and the voltage feedback control is constant voltage control, and upon detecting a voltage across terminals of the control object having reached a preset voltage while the output control unit performs a charging or discharging operation under the constant current control, the switching determination unit performs switching to the constant voltage control, under which a charging operation is performed.

5. The feedback control device according to claim 1, further comprising:

a second switch, wherein the second switch is configured to choose between a proportional output associated with the first control unit and a proportional output associated with the second control unit; and an adder, wherein a first input of the adder is an output of the second switch, a second input of the adder is an output of the integral unit, and an output of the adder is an input of the output control unit.

6. The feedback control device according to claim 5, wherein:

the control object is a battery; and the time of switching corresponds to a voltage of the battery reaching a first specification value of the battery, wherein the current feedback control is configured to maintain a constant charging current into the battery before the time of switching, and wherein the constant charging current corresponds to a second specification value of the battery.

* * * * *